(12) United States Patent
Alken et al.

(10) Patent No.: US 11,745,237 B2
(45) Date of Patent: Sep. 5, 2023

(54) COOLING UNIT OF A LAMINAR COOLING DEVICE

(71) Applicant: SMS GROUP GMBH, Düsseldorf (DE)

(72) Inventors: Johannes Alken, Siegen (DE); Henning Berg, Kreuztal (DE); Jens Kiessling-Romanus, Siegen (DE); August Sprock, Düsseldorf (DE)

(73) Assignee: SMS GROUP GMBH, Düsseldorf (DE)

( * ) Notice: Subject to any disclaimer, the term of this patent is extended or adjusted under 35 U.S.C. 154(b) by 411 days.

(21) Appl. No.: 16/980,699

(22) PCT Filed: Feb. 7, 2019

(86) PCT No.: PCT/EP2019/053000
§ 371 (c)(1),
(2) Date: Sep. 14, 2020

(87) PCT Pub. No.: WO2019/174826
PCT Pub. Date: Sep. 19, 2019

(65) Prior Publication Data
US 2021/0379637 A1 Dec. 9, 2021

(30) Foreign Application Priority Data

Mar. 12, 2018 (DE) .................... 10 2018 203 640.3
Nov. 12, 2018 (DE) .................... 10 2018 219 276.6

(51) Int. Cl.
*B21B 15/02* (2006.01)
*G05D 7/06* (2006.01)
*B21B 45/02* (2006.01)

(52) U.S. Cl.
CPC ...... *B21B 45/0218* (2013.01); *B21B 45/0233* (2013.01); *G05D 7/0623* (2013.01); *G05D 7/0652* (2013.01)

(58) Field of Classification Search
CPC ............ B21B 45/0218; B21B 45/0233; G05D 7/0623; G05D 7/0652; C21D 1/667
(Continued)

(56) References Cited

U.S. PATENT DOCUMENTS 4,932,232 A * 6/1990 Ballyns .................... B21B 37/32
                                                        72/201
6,237,385 B1 * 5/2001 Stodt ....................... B21B 43/02
                                                        72/201
(Continued)

FOREIGN PATENT DOCUMENTS

CN       102397888 A       4/2012
CN       102513385 A       6/2012
(Continued)

*Primary Examiner* — Scott R Kastler
*Assistant Examiner* — Michael Aboagye
(74) *Attorney, Agent, or Firm* — LUCAS & MERCANTI, LLP; Klaus P. Stoffel

(57) ABSTRACT

A cooling group for a laminar cooling device, including at least one cooling unit arranged above and below a strip to be cooled in order to supply the strip with a cooling liquid, including a central inlet via which cooling liquid is supplied, a distributing tube supplied with cooling liquid by the central inlet, and a number of supplying units supplied with cooling liquid from the distributing tube. Each supplying unit has a number of cooling nozzles via which cooling liquid is discharged onto the strip. In order to minimize the influence of the number of supplying units which are switched on or switched off, and thus have as little expenditure as possible, a volumetric flow rate regulating valve is arranged in or in front of the central inlet. The regulating (Continued)

valve is used to conduct a defined volume of cooling liquid through the central inlet per unit of time.

12 Claims, 1 Drawing Sheet

(58) Field of Classification Search
USPC .................................. 266/46, 83, 111, 113
See application file for complete search history.

(56) References Cited

U.S. PATENT DOCUMENTS

| | | | | |
|---|---|---|---|---|
| 8,463,446 | B2* | 6/2013 | Borgmann | C21D 9/573 |
| | | | | 700/282 |
| 9,868,142 | B2 | 1/2018 | Chen | |
| 10,722,929 | B2 | 7/2020 | Chen | |

FOREIGN PATENT DOCUMENTS

| | | |
|---|---|---|
| CN | 203419952 U | 2/2014 |
| CN | 103611735 A | 3/2014 |
| CN | 103861879 A | 6/2014 |
| CN | 104334754 A | 2/2015 |
| CN | 105013841 A | 11/2015 |
| CN | 105327949 A | 2/2016 |
| CN | 105436213 A | 3/2016 |
| CN | 206643135 U | 11/2017 |
| DE | 102010049020 A1 | 4/2012 |
| EP | 2817425 B1 | 12/2014 |
| JP | S5457414 A | 5/1979 |
| JP | S551916 A | 1/1980 |
| JP | S56157788 A | 12/1981 |
| JP | H02290923 A | 11/1990 |
| WO | 2014124867 A1 | 8/2014 |
| WO | 2014167138 A | 10/2014 |
| WO | 2014167138 A1 | 10/2014 |
| WO | 2014170139 A1 | 10/2014 |

* cited by examiner

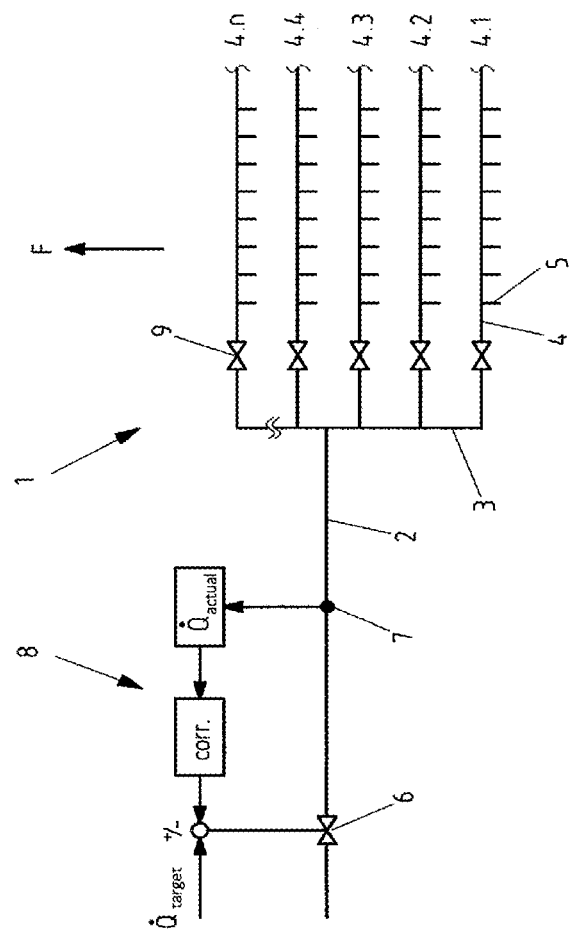

COOLING UNIT OF A LAMINAR COOLING DEVICE

CROSS-REFERENCE TO RELATED APPLICATIONS

The present application is a 371 of International application PCT/EP2019/053000, filed Feb. 7, 2019, which claims priority of DE 10 2018 203 640.3, filed Mar. 12, 2018, and DE 10 2018 219 276.6, filed Nov. 12, 2018, the priority of these applications is hereby claimed and these applications are incorporated herein by reference.

BACKGROUND OF THE INVENTION

The invention relates to a cooling group of a laminar cooling apparatus, of which at least one is arranged above and below a strip to be cooled in order to apply a cooling liquid to the strip, comprising a central inflow, via which cooling liquid is supplied, a distributor tube, which is supplied with cooling liquid from the central inflow, and a number of application units, which are supplied with cooling liquid from the distributor tube, wherein, on each application unit, there are arranged a number of cooling nozzles, via which cooling liquid is applied to the strip.

Typically, a generic laminar cooling apparatus (laminar cooling path) for cooling a rolled metal strip is subdivided into individual cooling groups. Each cooling group consists of a central inflow and a distributor tube which opens into at least four or more application units (cooling bars) which are arranged above or below the metal strip to be cooled. The groups which are arranged immediately after the rolling process are preferably provided with a greater throughflow rate than those situated at the end of the cooling means or those arranged just in front of the coiling means.

Generic cooling apparatuses are disclosed for example by CN 103861879, CN 102397888, CN 102513385 and CN 203419952 U.

The setting of a defined cooling curve requires a specific cooling strategy, according to which individual application units of a cooling group release the quantities of water such that the predefined cooling curve is achieved and, with changing process parameters (for example change in the rolling speed or final rolling temperature), the target temperature sought is maintained during the coiling (coiling temperature).

The prerequisite for this is the exit from the individual application units of the precisely designated quantity of water, which in the best case is the same, at all times, irrespective of which switching state occurs in the cooling group.

For this purpose, according to a first already known solution, it is provided that the inflow to a cooling group is realized by an elevated tank which is filled with the cooling water and by way of which a fixed initial pressure at the supply to the cooling group is provided. The switching fittings are situated immediately in front of the individual application units and are either completely open or completely closed according to whether or not cooling water is to be applied to the metal strip from the respective unit.

A disadvantage with this setup is that the actually constant initial pressure, according to the flow speed in the line systems, leads to a pressure loss which reduces the flowing quantity of water in the application units according to switching state. This is disadvantageously associated with the individual rate of throughflow through an application unit being dependent on the switching state of the entire group. A cooling strategy for strip cooling can consequently work only imprecisely.

According to a second already known solution, it is provided that a throughflow closed loop control is arranged in front of each application unit. In this way, the desired flow rate is then set independently of the initial pressure.

A disadvantage with this solution, however, is that the expenditure required for this is high, and a high level of investment is therefore necessary; furthermore, the expenditure in terms of regulation is significantly higher here than in the above-described variant.

SUMMARY OF THE INVENTION

The invention is therefore based on the object of designing a laminar cooling apparatus of the type mentioned in the introduction in such a way that the influence of the number of activated or deactivated application units on the flow speed and quantity of the water remains minimal. In this case, however, it has to be ensured that the expenditure in terms of investment remains as low as possible.

The achievement of said object by the invention is characterized in that a volume flow-regulating valve is arranged in or in front of the central inflow, by way of which regulating valve a defined volume of cooling liquid is conducted through the central inflow per unit of time.

The solution according to the invention ensures in a simple but effective manner that the application units are provided with precisely that quantity of liquid which is required for setting the cooling rate. A pressure loss on the short line path is negligible when taking into consideration the design features below, and so the application units of a cooling group can be provided with a supply in a uniform manner.

The laminar cooling apparatus is preferably designed to conduct through an apparatus arranged above or below the strip to be cooled a volume flow of between 30 and 200 $m^3/m^2$ h per strip side.

The cross section of the distributor tube and the cross section of the application units are preferably in a ratio of at least 1.0; particularly preferably, a value of at least 1.5 is provided for the ratio.

In the case of the arrangement of the laminar cooling apparatus above the strip to be cooled, said laminar cooling apparatus is preferably designed such that the ratio of the flow speed in the distributor tube to the flow speed in the application unit is in the range between 0.6 and 3.0.

In the case of the arrangement of the laminar cooling apparatus below the strip to be cooled, the ratio of the flow speed in the distributor tube to the flow speed in the application unit is preferably in the range between 0.2 and 1.0.

The Reynolds number in the central inflow, in the distributor tube and/or and in the application units preferably lies between 2000 and 3000. Here, the Reynolds number is the product of the density of the cooling medium and the flow speed and the characteristic length (reference length) of the body flowed through divided by the dynamic viscosity of the cooling medium.

The laminar cooling apparatus is preferably designed such that the pressure in an application unit arranged above the strip is kept above 0.05 bar.

Said laminar cooling apparatus is preferably designed such that the pressure in an application unit arranged below the strip is kept above 0.025 bar.

The setting of the volume flow-regulating valve is preferably determined here from the relationship $$\dot{Q}_{target} = \Sigma_{i=1}^{n} \dot{Q}_{target}^{(4,n)},$$

where
$\dot{Q}_{target}$ is the total target volume flow, and
$\dot{Q}_{target}^{(4,n)}$ is the target partial volume flow in the individual application units (4.1, 4.2, . . . ).

In this case, it is preferably provided that the target volume flow is regulated by a closed loop controlled system by way of which the volume flow-regulating valve is changed in terms of its setting, preferably with a correction value for throughflow rate setting taken into consideration.

The quantity of cooling water of each application unit is calculated according to the specification of a cooling strategy which is known per se. The total cooling medium requirement, according to the above formula, results from the sum of the quantities of cooling water of the individual application units (1 to n). The quantity of cooling water of the individual application units may be the same or different in the individual units.

Preferably, at least six, particularly preferably at least eight, application units are arranged in succession in the conveying direction of the strip in a cooling group.

The proposed concept accordingly aims at placing a volume flow-regulating valve in front of each cooling group, which regulating valve regulates the desired rate of throughflow in the group independently of the initial pressure. Furthermore, the diameter ratios (cross section ratios) of the supply lines to the cooling bars are selected in a specific manner. In this way, it is ensured that the activation or deactivation of application units (in whichever setup) of the group has no influence whatsoever on the local throughflow rate of an individual application unit.

Therefore, provision is preferably made of a groupwise regulated cooling path in which a specific application rate of between 30 and 200 m³/m² h per strip side is provided. The cross section ratio between distributor tube and cooling bar is in this case at least 1.0, preferably at least 1.5. The speed ratio between distributor tube and application unit of the upper cooling group preferably lies between 0.6 and 3.0; that of the lower cooling group preferably lies between 0.2 and 1.0.

The operating pressure of the upper application unit is at least 0.050 bar, and that of the lower application unit is at least 0.025 bar.

With the proposed solution, a cooling installation for cooling a slab or a strip by which an improved cooling effect can be achieved is provided.

The throughflow of the cooling medium is directly measured and regulated, so that a predefined value of the volume flow can be precisely maintained. For this purpose, provision is made of at least one closed loop controlled system to regulate a throughflow rate range. For this purpose, provision is made of at least one throughflow meter and at least one regulating valve, which are arranged at corresponding positions of the supply line.

In this way, the quantity of the cooling medium and the surface area to which said cooling medium is applied can be varied.

The cooling installation and its cooling power are preferably incorporated into a process model.

BRIEF DESCRIPTION OF THE DRAWING

The proposed apparatus or the corresponding procedure make it possible to achieve an improvement with regard to the regulation accuracy and the regulation speed of the cooling application (for example with regard to the "strip speed-up", the microstructure settings and the inhomogeneity of the strip).

DETAILED DESCRIPTION OF THE INVENTION

An exemplary embodiment of the invention is illustrated in the drawing. The sole FIGURE shows, in a schematic illustration, a cooling group of a laminar cooling apparatus, which cools the top side of a strip (not illustrated).

In the exemplary embodiment, the cooling group of a laminar cooling apparatus 1 comprises five application units 4 in the form of cooling bars, which are arranged in succession in the conveying direction F of the strip (not illustrated). Preferably, 6 to 8 application units 4 are combined to form a cooling group. For reasons of simplified illustration, this has been dispensed with in FIG. 1. The cooling bars 4 are equipped with a multiplicity of cooling nozzles 5, which apply cooling medium from above onto the strip (not illustrated).

The supply of cooling medium is realized through a central inflow 2 from which a distributor tube 3 is fed with cooling medium. The cooling medium passes from the distributor tube 3 to the cooling bars 4.

What is significant is that a volume flow-regulating valve 6 is arranged in or in front of the central inflow 2, by way of which regulating valve a defined volume of cooling liquid is conducted through the central inflow 2 per unit of time.

The throughflow through the central inflow is directly measured by means of the throughflow measurement means 7 and regulated on the basis of the measurement result. For each throughflow rate range, there is provided in each case (at least) one closed loop controlled system 8, in which the measured actual value is compared with the target value and, if appropriate, the regulating valve 6 is changed in terms of its setting by way of a correction value (corr.) for throughflow rate setting. At least one throughflow meter and/or one regulating valve are/is used at separate lines according to the throughflow rate.

By way of valves 9, individual application units 4.n can be set in terms of their throughflow rate and also activated or deactivated. In this way, it is possible to vary not only the cooling rate but also the application surface area. Alternatively, the valve 9 may also be designed solely as a switching valve (on/off) for exclusive setting of the switching surface. Through incorporation into a closed loop control, it is possible to compensate for changes to the target value specification of the cooling medium requirement, with respect to the cooling rate and/or the cooling surface area, of individual application units without any adverse effects.

The quantity of cooling medium and the application surface area can be varied here. The regulating device regulates, counter to the counterpressure (at least 40% of the total pressure loss), an aperture and thus makes possible stepless, volume-controlled supply of a quantity of water, in particular between 40% and 100% of the total quantity of water.

The throughflow measurement allows the desired switching state to be checked, or monitored in the automation system.

Additionally, a functionality for checking the functional unit of the cooling device or of the application units may be provided. For this purpose, it is possible to allow during operation an active response within a process model. Malfunctions can be established within the maintenance cycle.

In this case, the complete water management can be incorporated, and the pump control can be performed via the calculated and set water quantities. In this way, only the mass quantity required for the cooling task is released by way of the pumps.

LIST OF REFERENCE SIGNS

1 Cooling group of the laminar cooling apparatus
2 Central inflow
3 Distributor tube
4 Application unit (cooling bar)
4.1 Application unit (cooling bar)
4.2 Application unit (cooling bar)
4.3 Application unit (cooling bar)
4.4 Application unit (cooling bar)
4.n Application unit (cooling bar)
5 Cooling nozzle
6 Volume flow-regulating valve
7 Throughflow measurement means
8 Closed loop controlled system
9 Valve
F Conveying direction

The invention claimed is:

1. A cooling group for a laminar cooling apparatus arrangeable above and below a strip to be cooled in order to apply a cooling liquid to the strip, comprising:
a central inflow via which the cooling liquid is supplied;
a distributor tube that is supplied with the cooling liquid from the central inflow;
a number of application units that are supplied with the cooling liquid from the distributor tube;
a number of cooling nozzles arranged on each of the application units for applying the cooling liquid to the strip;
a volume flow-regulating valve arranged in or in front of the central inflow and configured so as to conduct a defined, variable volume of the cooling liquid through the central inflow per unit of time, wherein setting of the volume flow-regulating valve is determined from a relationship $$\dot{Q}_{target} = \Sigma_{i=1}^{n} \dot{Q}_{target}^{(4.n)},$$

where
$\dot{Q}_{target}$ is a total target volume flow rate, and
$\dot{Q}_{target}^{(4.n)}$ is a target partial volume flow rate in the individual application units; and
a closed loop control system configured to continuously regulate the target volume flow ($\dot{Q}_{target}$) by changing the setting of the volume flow regulating valve, wherein the closed loop control system includes a throughflow meter for measuring the through flow through the central inflow, and a comparator configured to compare a measured actual value with the target value of the volume flow rate.

2. The cooling group for a laminar cooling apparatus according to claim 1, wherein the cooling group is configured to conduct through the laminar cooling apparatus arranged above or below the strip to be cooled a volume flow rate of the cooling liquid of between 30 and 200 $m^3/m^2$ h per strip side.

3. The cooling group for a laminar cooling apparatus according to claim 1, wherein a ratio between a cross section of the distributor tube and a cross section of each of the application units is at least 1.0.

4. The cooling group for a laminar cooling apparatus according to claim 3, wherein the ratio between the cross section of the distributor tube and the cross section of each of the application units is at least 1.5.

5. The cooling group for a laminar cooling apparatus according to claim 1, wherein, when the laminar cooling apparatus is arranged above the strip to be cooled, said laminar cooling apparatus is designed so that a ratio of flow speed in the distributor tube to flow speed in the application units is in the range between 0.6 and 3.0.

6. The cooling group for a laminar cooling apparatus according to claim 1, wherein, when the laminar cooling apparatus is arranged below the strip to be cooled, said laminar cooling apparatus is designed so that a ratio of flow speed in the distributor tube to flow speed in the application units is in the range between 0.2 and 1.0.

7. The cooling group for a laminar cooling apparatus according to claim 1, wherein a Reynolds number in the central inflow, in the distributor tube and/or and in the application units lies between 2000 and 3000.

8. The cooling group for a laminar cooling apparatus according to claim 1, wherein the cooling group is configured to maintain pressure in an application unit arranged above the strip above 0.05 bar.

9. The cooling group for a laminar cooling apparatus according to claim 1, wherein the cooling group is configured to maintain pressure in an application unit arranged below the strip above 0.025 bar.

10. The cooling group for a laminar cooling apparatus according to claim 1, wherein the closed loop controlled system is configured to regulate the target volume flow rate($\dot{Q}_{target}$) by taking into consideration a correction value for throughflow rate setting.

11. The cooling group for a laminar cooling apparatus according to claim 1, wherein at least six application units are arranged in succession in a conveying direction of the strip.

12. The cooling group for a laminar cooling apparatus according to claim 11, wherein at least eight application units are arranged in succession in a conveying direction of the strip.

* * * * *